United States Patent [19]
Michel et al.

[11] 3,844,756
[45] Oct. 29, 1974

[54] METHOD AND APPARATUS FOR PRODUCING MERCURY SWITCHES

[75] Inventors: Karl-Heinz Michel, Nuernberg; Gustav Hahn, Altenfurt, both of Germany

[73] Assignee: W. Guenther GmbH, Nurnberg, Germany

[22] Filed: July 3, 1972

[21] Appl. No.: 268,554

[30] Foreign Application Priority Data
July 21, 1971    Germany............................ 2136428

[52] U.S. Cl.......................... 65/59, 65/138, 65/154, 65/155
[51] Int. Cl............................................ C03c 27/02
[58] Field of Search ....... 65/58, 138, 139, 154, 155, 65/59; 200/233, 234, 235, 236, 231

[56] References Cited
UNITED STATES PATENTS
2,218,254    10/1940    Wengel............................ 65/110 X

*Primary Examiner*—Arthur D. Kellogg
*Attorney, Agent, or Firm*—Spencer & Kaye

[57] ABSTRACT

A method and an apparatus for producing mercury switches of uniform dimensions very quickly, inexpensively and preferably automatically by melting and hermetically sealing at first one end of a glass tube by means of electric heat rays, by then filling a certain quantity of mercury into the other end of the tube, and by then melting and sealing the other end in the same manner. Pinshaped electrodes which project from the outside for predetermined distances into the glass tube through at least one end thereof are also sealed hermetically to the respective end or ends of the glass tube when melted.

9 Claims, 8 Drawing Figures

PATENTED OCT 29 1974
3,844,756
SHEET 1 OF 3
Fig. 1
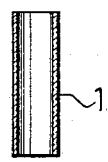
Fig. 2
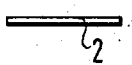
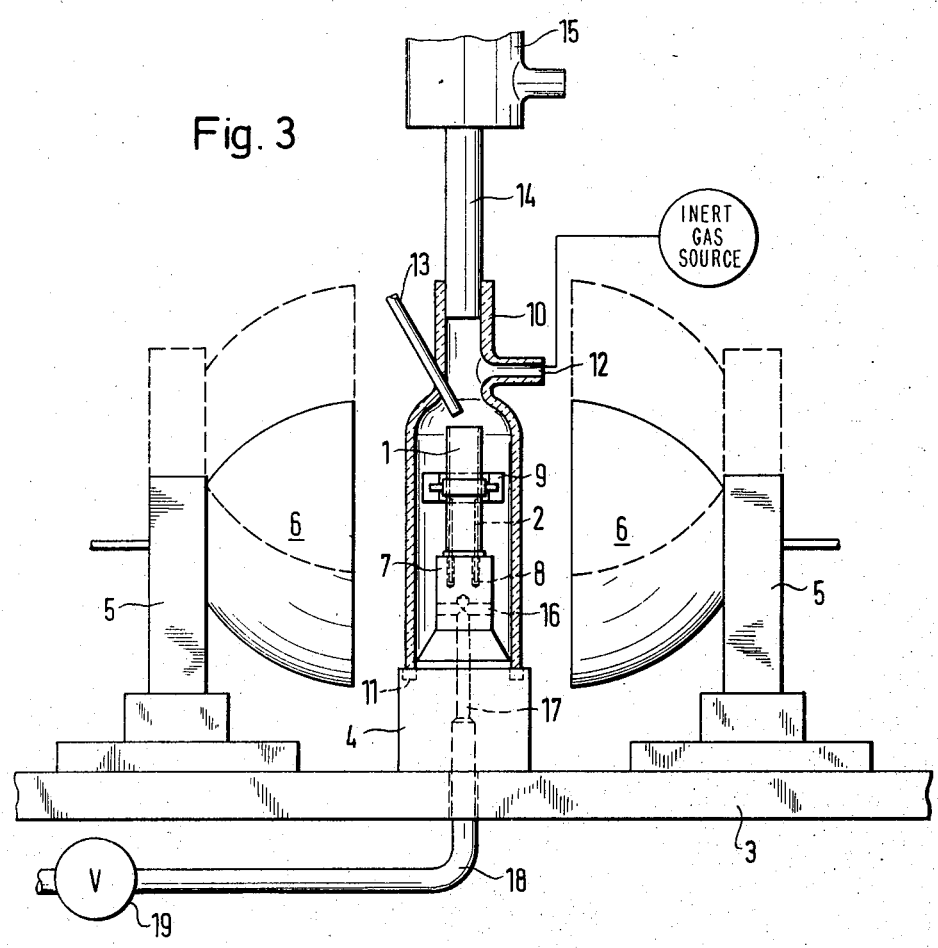
Fig. 3

METHOD AND APPARATUS FOR PRODUCING MERCURY SWITCHES

The present invention relates to a method and an apparatus for producing mercury switches each of which comprises a glass tube and pin-shaped electrodes projecting into this tube through at least one hermetically closed end thereof. After one end of this glass tube has been melted so as to be sealed hermetically and also hermetically around the part of the electrode or electrodes projecting through this end, a small quantity of mercury is filled with the tube through the other open end thereof and either an inert gas or gas mixture is also filled into the tube or a vacuum is formed therein. This other end of the glass tube, either with or without at least one pin-shaped electrode projecting therethrough, is then melted so as likewise to be closed hermetically.

In the production of such mercury switches it has been conventional prior to this invention to close the ends of the glass tubes by melting them by means of open gas flames. These methods were rather complicated and expensive and required a considerable length of time. Furthermore, it was practically impossible to mass-produce such switches of exactly uniform dimensions and to carry out such a production automatically.

It is an object of the present invention to provide a method and an apparatus for producing such mercury switches in a very simple manner and more economically and quickly and also much more uniformly than this has hitherto been possible.

For attaining this object, the invention provides primarily that the ends of the glass tube through one or both of which one or more electrodes project into the tube, are to be sealed tightly by being melted by the rays of one or more infrared lamps or by means of one or more heating wires or heating coils.

Since the method according to the invention employs electric heating means rather than an open gas flame for melting the ends of the glass tube so as to close the same hermetically and also tightly around the electrodes projecting through one or both of these ends, the entire method of producing such mercury switches may be carried out very easily and the individual steps of this method may also be very accurately controlled. The glass tubes for producing a large series of mercury switches may all be made of exactly the same length and also, if desired, of a very short length, and the ends of each glass tube may be hemispherically rounded. If one or more infrared lamps are employed for melting the ends of each glass tube, an infrared-ray absorbing glass, for example, a so-called green glass, may be employed or a normal glass, for example, a soft-soda glass, which is provided with an infrared-absorbent coating, for example, of soot. It is even possible to employ such a normal glass without any infrared-absorbent coating if electric heating wires or heating coils are employed in place of infrared lamps for melting and closing the ends of the glass tube.

For insuring that the electrodes will be properly and permanently fused together with one or both ends of the glass tube, it is advisable to make these electrodes of a ferronickel which has a coefficient of expansion substantially equal to that of the glass tube.

If the ends of the glass tube are to be melted for closing the same by employing at least one infrared lamp, the method according to the invention is preferably carried out by first passing an inert gas through the tube before switching on the lamp or lamps to close the first end of the tube. The infrared lamp or lamps then remain switched on until the glass has flowed together at this end and tightly around the part of each electrode projecting through this end into the tube. This insures that the glass tube will already contain inert gas when, after this end of the tube and the electrodes therein have cooled off, the mercury is filled into the tube through the open other end thereof. When melting this other end of the glass tube, the infrared lamp or lamps should remain switched on until the gas contained in the now tightly closed tube will be heated to such an extent that it will press the soft glass of this end outwardly so as to have a substantially hemispherical shape rather than a pointed shape like that of the conventional mercury switches in which the ends of the glass tubes are melted by open gas flames and are drawn outwardly into points.

According to one preferred embodiment of the invention, the apparatus for carrying out the new method comprises a holder which supports the open glass tube in a vertical position, and at least one infrared lamp which is movable to two different positions for melting the ends of the glass tube so as to close the same hermetically. The apparatus may also be provided with two infrared lamps which are located at diametrically opposite sides of the glass tube and are directed so that the focal points of the rays of both lamps lie substantially on the central axis of the glass tube. The apparatus is further provided with a socketlike member on which the glass-tube holder is mounted and which is also provided with one or more vertical blind bores for receiving the pin-shaped electrodes for the lower end of the glass tube. This socketlike member is further designed so as to permit a bell-shaped cover to be lowered from above over the glass tube and its holder and to be tightly connected to the socketlike member. The bell-shaped cover is provided with a mercury filling tube which is directed toward the upper end of the glass tube for dropping a predetermined quantity of mercury therein, and with at least one opening through which an inert gas may be passed into the bell-shaped cover and then into the glass tube or through which, if desired, the glass tube may be evacuated. The inside of the bell-shaped cover when connected to the socketlike member is connected by a line passing through the latter to a valve which may be opened and closed from the outside by suitable control means. The bell-shaped cover may be lifted from the socketlike member and lowered and pressed thereon by any suitable means, for example, by a pneumatic cylinder-and-piston unit. If the melting operations are to be carried out by means of infrared lamps, the bell-shaped cover or at least those parts thereof through which the infrared rays should pass to the ends of the glass tube should, of course, consist of a material, for example, quartz glass, which does not impede the flow of these rays.

For producing mercury switches in which one or more electrodes are also to be inserted through and melted together with the upper end of the glass tube, another electrode holder may also be mounted on the socketlike member.

The apparatus according to the invention is preferably designed so as to permit the entire production of the mercury switches to be carried out fully automatically by a program control unit which may be started by an electric switch and will then control the individual steps of the method automatically in the proper order of succession.

The features and advantages of the present invention will become more closely apparent from the following detailed description thereof which is to be read with reference to the accompanying drawings, in which FIG. 1 shows a side view of a glass tube for producing a mercury switch;

FIG. 2 shows a side view of a pin-shaped electrode for the switch;

FIG. 3 shows a diagrammatic side view of an apparatus for carrying out the method according to the invention;

FIG. 7 shows a completed mercury switch which is likewise made of a glass tube as shown in FIG. 4 but is provided with a pair of electrodes projecting through each end of the tube; while

Figure 4:
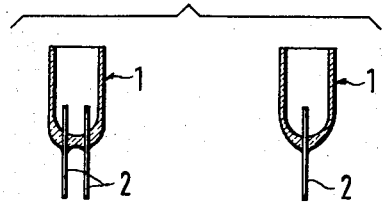
FIG. 4 shows a front view and a side view of the glass tube according to FIG. 1 with two electrodes as shown in FIG. 2 projecting into and fused together with one end of the glass tube.

In the drawings, FIG. 1 shows a glass tube 1 which consists of so-called green glass which absorbs infrared rays, while FIG. 2 shows a pin-shaped electrode 2 of ferronickel which has a coefficient of expansion substantially equal to that of the glass tube 1.

FIG. 3 illustrates diagrammatically an apparatus for carrying out the method according to the invention for producing mercury switches. This apparatus comprises a base plate 3 on which a socketlike supporting member 4 and two lamp holders 5 are mounted. Each of these lamp holders 5 carries an infrared lamp 6, for example, a high-energy halogen infrared lamp. These infrared lamps 6 are adjustable so as to be movable to two operating positions, that is, to a lower position as indicated by solid lines and an upper position as indicated by dotted lines. An upper narrower part 7 of the socketlike supporting member 4 is provided with two vertical blind bores 8 into which two pin-shaped electrodes 2 are inserted. By suitable connecting means, not shown, the supporting member 4 further carries a tube holder 9 which is adapted to hold the glass tube 1. The upper part 7 of the supporting member 4 with the two electrodes 2 and the tube holder 9 with the glass tube 1 are covered by a bell-shaped member 10 the lower end of which is supported on a gasket 11 within an annular groove in the upper end of the supporting member 4. This bell-shaped member 10 which consists of an infrared-transparent material, for example, quartz glass, is provided with a gas inlet opening 12 and a mercury filling tube 13. Into the upper end of the bell-shaped member 10 a piston rod 14 is tightly fitted which may be moved upwardly and downwardly by any suitable means, for example, by a pneumatic cylinder-and-piston unit 15, so that, when the bell-shaped member 10 is shifted downwardly, it will be located in the position as shown in FIG. 3, while when it is shifted upwardly, the bell-shaped member 10 will be located above the glass tube 1. The upper part 7 of the supporting member 4 has a transverse bore 16 which communicates through a vertical bore 17 in the member 4 with a conduit 18 which extends downward and outward from the supporting member 4 and which is provided with a valve 19.

Before the apparatus according to FIG. 3 is operated, the bell-shaped member 10 is lifted so far above the holder 9 that two pin-shaped electrodes 2 as shown in FIG. 2 may be inserted into the bores 8, and a glass tube 1 according to FIG. 1 may thereafter be inserted into the holder 9. The two electrodes 2 will then project through the open lower end of the glass tube 1.

Figure 5:
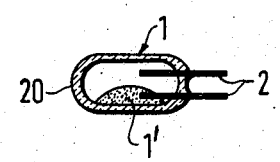
FIG. 5 shows a completed mercury switch which is made of a glass tube as shown in FIG. 4.

The apparatus as shown in FIG. 3 is connected to a program control unit, not shown, which is adapted to control all operations of the apparatus automatically and may be started by an electric switch. It may also be used for controlling the insertion of the electrodes 2 and the glass tube 1. Thereafter, the pneumatic unit 15 is actuated the piston rod 14 of which then lowers the bell-shaped member 10 until its lower end engages upon the gasket 11. Shortly thereafter, an inert gas is passed through the inlet opening 12 into the bell-shaped member 10 and thus also into the glass tube 1 from which it then flows through the transverse bore 16, the vertical bore 17 and the conduit 18 and the opened valve 19 toward the outside. While the inert gas flows in this manner, the infrared lamps 6 are switched on which are adjusted so that their focal points are located on the central axis of glass tube 1. The focussed rays of the infrared lamps 6 produce at their common focal point a temperature of about 1,600° C which softens the lower end of the infrared-absorbent glass tube 1 so that the glass will contract around the electrodes 2. The infrared lamps 6 remain switched on until the glass tube 1 is fused together between the electrodes 7 and its lower end is hermetically closed as shown in FIG. 4. After the lamps 6 are switched off, the closed lower end of the glass tube 1 and the two electrodes 2 will cool off. Thereafter, a predetermined quantity of mercury 1' is filled through the filling tube 13 into the lower end of glass tube 1 which was previously tightly closed. The infrared lamps 6 are then shifted upwardly to the position as shown in dotted lines in FIG. 3, in which the common focal point of the two lamps 6 will be located slightly below the upper end of the glass tube 1 and on the axis thereof. The lamps 6 are then again switched on and their focussed rays will soften the upper end of glass tube 1 which will bend inwardly and tightly close the glass tube. The infrared lamps 6 remain switched on until the inert gas in the tightly closed glass tube 1 is heated and thereby expands and presses the soft glass upwardly and thereby molds the upper end of the tube to a substantially hemispherical shape 20, as shown in FIG. 5 which illustrates the finished mercury switch. The supply of inert gas through the inlet opening 12 is then switched off and the bell-shaped member 10 is lifted by the piston rod 14 of the compressed-air unit 15. The finished mercury switch may then be withdrawn from the holder 9 and the two infrared lamps 6 may thereafter be moved back to their lower position as shown in FIG. 3.

For producing mercury switches which are filled with gas under pressure, the program control unit is adjusted or modified so that valve 19 will remain closed during the melting operations. Consequently, a higher pressure will be built up in the bell-shaped member 10 and thus also in the glass tube 1, and after the latter has been tightly closed, this higher pressure the strength of which may be predetermined will remain in the glass tube.

For producing mercury switches containing a vacuum, valve 19 remains likewise closed, and the air contained in the bell-shaped member 10 and in the glass tube 1 is evacuated through the filling opening 12 or an additional opening, not shown, and this air is replaced by an inert gas which is filled in through the filling opening 12. This filled-in gas is, however, then again sucked off to such an extent that in the bell-shaped member 10 and in the glass tube 1 a residual atmosphere will remain which consists of inert gas and not of air oxygen so that no oxidation of the electrodes can occur when the glass is melted.

Figure 6:
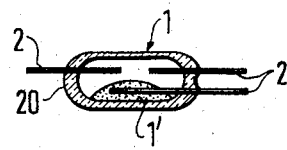
FIG. 6 shows a completed mercury switch which is likewise made of a glass tube as shown in FIG. 4 but is provided with three electrodes.
Figure 7:
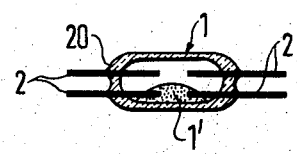
Figure 8:
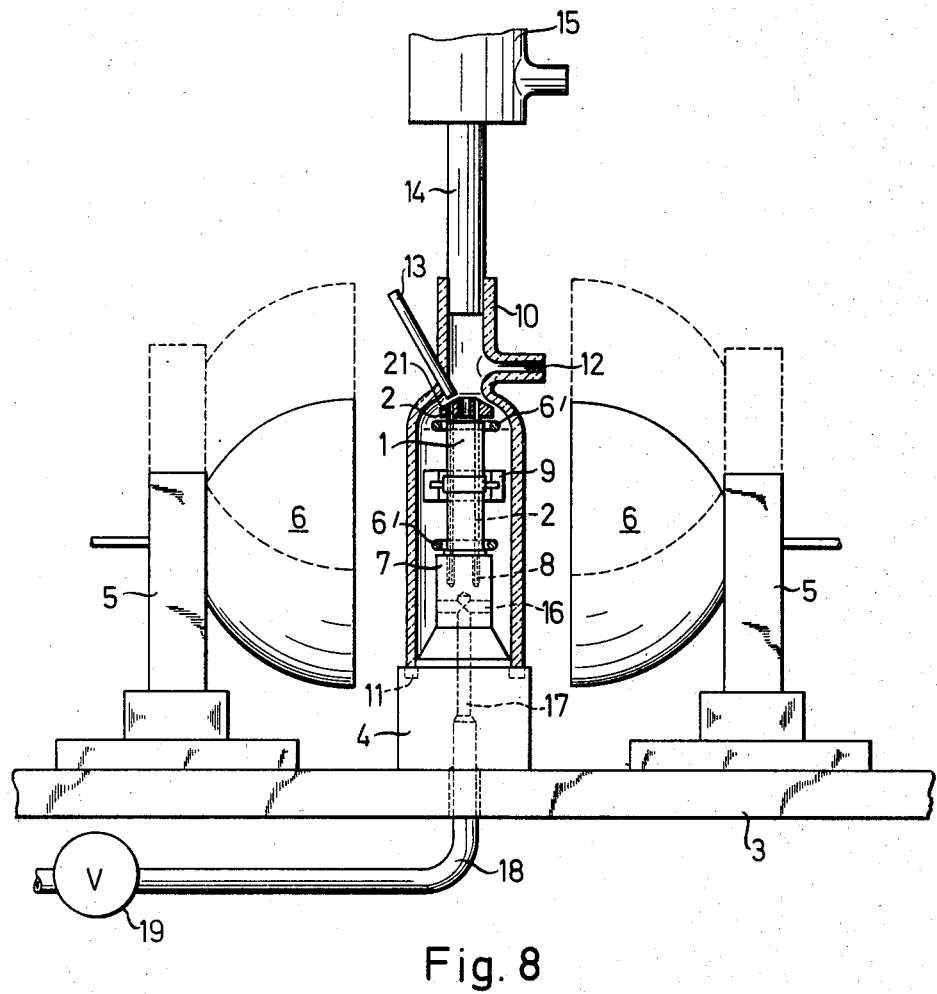
FIG. 8 shows a view similar to FIG. 3 in which the apparatus is also provided with a holder for holding one or more electrodes for the upper end of the glass tube.

For producing mercury switches with one or more electrodes extending into each end of the glass tube 1, the apparatus as previously described with reference to FIG. 3 may be modified in the manner as shown in FIG. 8 in which an additional electrode holder 21 is connected by suitable means, not shown, either to the tube holder 9 or directly to the supporting member 4. This electrode holder 21 holds one or more electrodes which are inserted into the open upper end of glass tube 1 and project from above for a certain distance into the latter. The operation of melting the opposite ends of the glass tube and fusing them to the electrodes are carried out in the same manner as previously described. FIG. 6 illustrates such a mercury switch with three electrodes 2 and FIG. 7 with four electrodes 2.

As also indicated in FIG. 8, the ends of the glass tube 1 may also be hermetically closed and fused to the electrodes 2 by means of two heating coils 6' which are mounted so as to extend concentrically around the glass tube 1 at a small radial distance therefrom at the particular levels where the ends of the glass tube are to be heated. At first, the lower heating coil 6' is switched on for closing the lower end of the glass tube and fuse the same to the lower electrode or electrodes 2. This loer heating coil 6' is then switched off and, after the other treatments as previously described have been carried out, the upper heating coil 6' is switched on for closing the upper end of the glass tube and, if any electrode or electrodes are to extend also through this end, to fuse the glass to these electrodes.

Although our invention has been illustrated and described with reference to the preferred embodiments thereof, we wish to have it understood that it is in no way limited to the details of such embodiments but is capable of numerous modifications within the scope of the appended claims.

Having thus fully described our invention, what we claim is:

1. A method of making a mercury switch having a mercury-containing closed glass body into which extend at least two electrodes hermetically sealed to the glass body, comprising the following steps:
  a. positioning a glass tube open at both ends in an enclosed space;
  b. positioning said electrodes through one of the open glass ends;
  c. hermetically fusing, by radiating heat, said glass tube at said one end to close the same and to seal in said electrodes;
  d. introducing, subsequent to step (c), mercury into said tube through the other of said ends;
  e. hermetically fusing, by radiating heat, said glass tube at said other end to close the same; and
  f. passing an inert gas through the enclosed space at a rate sufficient to replace the air by the inert gas at least prior to and during step (c) and during step (e) for performing these steps in oxygen-free surroundings; and
  g. maintaining the glass tube in the enclosed space continuously through steps (b), (c), (d), (e) and (f).

2. A method as defined in claim 1, wherein step (f) is continuously performed from prior to step (c) to subsequent to step (e).

3. A method as defined in claim 2, including the step of expanding, subsequent to step (e) and in a soft condition of said fused other end of said glass tube, the inert gas in said glass tube by said radiating heat to cause a hemispheric ballooning of said fused other end.

4. A method as defined in claim 3, including the steps of continuing to apply said radiating heat to said other end subsequent to step (e) for effecting the expansion of said inert gas in said glass tube; and discontinuing the application of said radiating heat to said other end of said glass tube when said ballooning has reached a predetermined extent.

5. A method as defined in claim 1, including the step of cooling, subsequent to step (c) and simultaneously with step (d), said one end of said glass tube in the enclosed space.

6. An apparatus for making a mercury switch, comprising in combination:
  a. a supporting member;
  b. a holder for positioning a glass tube on said supporting member;
  c. electrode holding means in said supporting member for receiving one end of electrodes and positioning the same on said supporting member for passage into the positioned tube through one of its ends;
  d. infrared radiation sources disposed at opposite sides of said supporting member for melting and closing the ends of the glass tube, each radiation source being arranged to assume first and second operative positions; said infrared radiation sources including means for focussing the heat rays emitted thereby; said supporting means and said holder being so arranged with respect to said infrared radiation sources that the focussing points of said infrared radiation sources lie approximately on the longitudinal axis of the positioned glass tube and respective opposite ends of the positioned tube are in the effective range of the heat rays in said first and second positions of said infrared radiation sources;
  e. a bell-shaped member positioned on said supporting member for hermetically enclosing said holder and the glass tube positioned by said holder;
  f. means provided on said bell-shaped member defining an inlet connected to a source of inert gas;
  g. a filling tube held by said bell-shaped member and mounted in a position with respect to said holder to permit introduction of mercury into the positioned tube;

h. a conduit passing externally from said supporting member through supporting member and communicating with the space enclosed by said bell-shaped member; and i. a valve provided in said conduit for selectively shutting off said conduit.

7. An apparatus as defined in claim 6, including power means for lifting said bell-shaped member out of its hermetic engagement with said supporting member.

8. An apparatus as defined in claim 7, wherein said power means is arranged for pneumatic actuation.

9. An apparatus as defined in claim 6, including an additional electrode holding means secured at least indirectly to said supporting member, said additional electrode holding means being provided for receiving one end of additional electrodes and positioning the same for passage into the positioned glass tube through the other of its ends.

* * * * *